US008229604B2

(12) United States Patent
Villaume et al.

(10) Patent No.: US 8,229,604 B2
(45) Date of Patent: Jul. 24, 2012

(54) METHOD AND SYSTEM FOR AUTOMATICALLY MANAGING A CONVOY OF AIRCRAFT DURING A TAXIING

(75) Inventors: Fabrice Villaume, Seysses (FR); Pierre Scacchi, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 510 days.

(21) Appl. No.: 12/475,197

(22) Filed: May 29, 2009

(65) Prior Publication Data

US 2009/0299552 A1 Dec. 3, 2009

(30) Foreign Application Priority Data

Jun. 2, 2008 (FR) ..................................... 08 03002

(51) Int. Cl.
*G05D 1/00* (2006.01)

(52) U.S. Cl. .................... 701/3; 701/4; 701/10; 701/22; 701/117; 701/120

(58) Field of Classification Search ........................ None
See application file for complete search history.

(56) References Cited

U.S. PATENT DOCUMENTS 5,400,864 A * 3/1995 Winner et al. ................ 180/169
6,032,097 A * 2/2000 Iihoshi et al. .................... 701/96
6,144,915 A * 11/2000 Shiomi et al. ................. 701/120
6,223,117 B1 * 4/2001 Labuhn et al. .................. 701/93
6,462,697 B1 * 10/2002 Klamer et al. .................. 342/36
6,463,383 B1 * 10/2002 Baiada et al. ................. 701/120
6,703,944 B1 * 3/2004 Obradovich .................. 340/903
7,212,920 B1 * 5/2007 Bailey et ........................ 701/457
7,222,017 B2 * 5/2007 Clark et al. ................... 701/120
7,248,963 B2 * 7/2007 Baiada et al. ................. 701/120
7,340,327 B2 * 3/2008 Villaume et al. ................ 701/15
7,613,563 B2 * 11/2009 Haegebarth et al. .......... 701/117
7,623,956 B2 * 11/2009 Kawaguchi ................... 701/117
7,747,360 B2 * 6/2010 Canu-Chiesa et al. ............ 701/3
7,894,982 B2 * 2/2011 Reeser et al. ................. 701/420
8,024,078 B2 * 9/2011 Coulmeau et al. ................ 701/3

(Continued)

FOREIGN PATENT DOCUMENTS

FR 2 816 091 5/2002

OTHER PUBLICATIONS

Preliminary Search Report dated Apr. 2, 2009 w/ English translation.

(Continued)

*Primary Examiner* — Khoi Tran
*Assistant Examiner* — Jonathan L Sample
(74) *Attorney, Agent, or Firm* — Dickinson Wright PLLC

(57) ABSTRACT

Disclosed is a method and system for managing a convoy of aircraft during taxiing. Taxi management is carried out by exchanging, by a first data transmission unit, information between the aircraft of the convoy concerning aircraft flight parameters of the aircraft within the convoy, and exchanging, between the aircraft of the convoy and at least one control station that manages the convoy collectively, information relating to the collective convoy. The exchange can be carried out by a second data transmission unit, with the ground control station receiving from each aircraft in the convoy information relating to convoy status, centralizing the received information, scheduling the convoy, and transmitting to each aircraft a convoy status table that indicates overall status of the convoy.

10 Claims, 8 Drawing Sheets

U.S. PATENT DOCUMENTS

| | | | | |
|---|---|---|---|---|
| 8,026,833 | B2 * | 9/2011 | Villaume et al. | 340/961 |
| 2002/0183900 | A1 * | 12/2002 | Sainthuile | 701/4 |
| 2004/0006412 | A1 * | 1/2004 | Doose et al. | 701/10 |
| 2004/0049343 | A1 * | 3/2004 | Yamadaji et al. | 701/301 |
| 2006/0094417 | A1 * | 5/2006 | Allen et al. | 455/423 |
| 2009/0018713 | A1 * | 1/2009 | Coulmeau et al. | 701/3 |
| 2009/0295601 | A1 * | 12/2009 | Villaume et al. | 340/961 |
| 2009/0299552 | A1 * | 12/2009 | Villaume et al. | 701/3 |

OTHER PUBLICATIONS

Database INSPEC [Online] Institution of Electrical Engineers, Stevenage, GB ; Jan. 21, 2008, Espinosa F et al: "Reduction of lateral and longitudinal oscillations of vehicle's platooning by means of decentralized overlapping control" XP002522237 Database accession No. 9885171 * abrege * & 46$^{th}$ IEEE Conference on Decision and Control Dec. 12-14, 2007 New Orleans, LA, USA, Dec. 14, 2007, pp. 690-695, Proceedings of the 46th IEEE Conference on Decision and Control IEEE Piscataway, NJ, USA ISBN: 978-1-4244-1497-0 * p. 692, ligne 14—p. 693, ligne 17.

Database INSPEC [Online] The Institution of Electrical Engineers, Stevenage, GB; 2006, Khatir M E et al:"A decentralized lateral-longitudinal controller for a platoon of vehicles operating on a plane" XP002522238 Database accession No. 9047022 * abrege * & 2006 American Control Conference Jun. 14-16, 2006 Minneapolis, MN, USA, Jun. 14, 2006, p. 6 pp., 2006 American Control Conference (IEEE Cat. No. 06CH37776C) IEEE Piscataway, NJ, USA ISBN: 1-4244-0210-7.

Database INSPEC [Online] The Institution of Electrical Engineers, Stevenage, GB; Oct. 2007, Sampigethaya K et al; "Amoeba: robust location privacy scheme for VANET" XP002522239 Database accession No. 9686310 * abrege * & IEEE Journal on Selected Areas in Communications IEEE USA, vol. 25, No. 8, Oct. 8, 2007, pp. 1569-1589, ISSN: 0733-8716.

* cited by examiner

METHOD AND SYSTEM FOR AUTOMATICALLY MANAGING A CONVOY OF AIRCRAFT DURING A TAXIING

FIELD OF THE INVENTION

The present invention relates to a method and a device for controlling at least partially automatically an aircraft taxiing on the ground, in particular in an airport area, such as an airport or an aerodrome, within a convoy of aircraft. It also relates to a method and a system for automatically managing at least one such convoy of aircraft.

The present invention therefore applies to the taxiing of an aircraft on the ground, in particular of an airplane, civilian or military, for transporting passengers or freight, or even a drone. It more particularly relates to the total or partial automation of the control of such an aircraft taxiing on the ground, within a convoy of aircraft.

BACKGROUND OF THE INVENTION

In the context of the present invention:

- the expressing “taxiing on the ground” should be understood to mean any possible type of taxiing of an aircraft, such as taxiing on a runway during landing and take-off phases, or taxiing on taxiways or on maneuvering areas, in particular;
- the expression “convoy of aircraft” should be understood to mean a coherent set of at least two aircraft following one another in Indian file This set is coherent if the members of the convoy are likely to exchange, between them and with ground control, information making it possible to follow a trajectory on the ground according to a behavior (particularly in terms of speed and/or acceleration) suited to the stability and the safety of the convoy;
- the expression “automation” should be understood to mean the action of a device capable of handling, partially or totally, that is, without assistance or with partial human assistance, the control of an aircraft on the ground; and
- the expression “control” should be understood to mean the action of directing the maneuvers, or movements, of the aircraft on the ground.

Currently, the pilot controls the movements of the aircraft on the ground, using manual piloting members (for example a control wheel used to steer the wheel of the front landing gear, an engine thrust control lever, brake pedals, a rudder bar), along a trajectory on the ground. These members are used to control actuators of the aircraft capable of influencing the movements of the aircraft, in particular through the intermediary of the engines, the brakes, the orientation of the wheel of the front landing gear (and possibly the orientation of the rear gears), and the drift control rudder.

The term “trajectory on the ground” designates the path taken by the aircraft on an airport area such as an aerodrome or an airport, including in particular the take-off and landing runways, the taxiways, the turn-around areas, the holding bays, the stop bars, the stands, the maneuvering areas and the parking areas.

The trajectory on the ground is generally supplied to the pilot, in particular via radiocommunication means or another usual means such as a digital data transmission link, by an air traffic controller or by a ground controller, but it can also, in certain cases, be chosen freely by the pilot.

The trajectory is defined in the form of a succession of elements of the airport area, and it indicates a path making it possible to reach, from a point or region of the airport area, another point or region of this area.

The expression “element of the airport area” denotes any portion of the area, designated or not by a name, and identified as a distinct and delimited part of the area. An element can, if necessary, include one or more others. The term “element” designates in particular the take-off and landing runways, the taxiways, the turn-around areas, the holding bays, the stop bars, the stands, the maneuvering areas and the parking areas.

Knowing the ground trajectory to be followed, the pilot acts on the abovementioned piloting members, in order to the control the movements of the aircraft on the ground (the longitudinal speed and the lateral displacements of the aircraft). He also does so to follow the trajectory so that all parts of the aircraft in contact with the ground (the wheels of the front and rear landing gears) remain permanently on the surface provided for aircraft taxiing. For most airports accommodating civilian or military transport airplanes, the term “ground” is understood to mean the parts covered with tarmac and provided for this purpose. The objective of the pilot is therefore to manage a trajectory so that none of the parts of the aircraft in contact with the ground is, at a given moment, on a portion of the airport area not designed for aircraft taxiing, in particular portions covered with grass, earth or sand, or portions designed solely for the taxiing of lighter vehicles (cars, trucks).

During this taxiing phase, the pilot may be required, on instruction or not from ground control, to follow at a given distance another aircraft taxiing on the ground, which can be likened to an informal and non-coherent convoy of two aircraft. This is generally the case when they are both following one and the same trajectory portion, or they are going to places close to the airport.

The manual piloting of an aircraft on the ground represents a major workload for the pilot. The latter must in practice:

- follow the trajectory provided, controlling both the speed of the aircraft with the engine thrust levers and the brake pedals, and the rotation along the yaw axis with the control wheel and rudder bar;
- be careful not to depart from the surface provided for aircraft taxiing; and
- monitor the external environment, in particular;
  - the movements of the other vehicles maneuvering in the airport area, in particular the aircraft currently taxiing on the ground, taking off or landing, cars and trucks; and
  - the obstacles present around the aircraft and likely to cause a close contact with the latter, in particular the buildings, the passenger bridges, the antennas, the indication and signaling panels, and the other vehicles on the ground, whether immobile or not (aircraft, cars, trucks, apron drive passenger bridges).

This major workload can, consequently, affect the vigilance of the pilot, and lead, in particular, to an unscheduled trajectory being followed, departures from the surface provided for aircraft taxiing, and close contacts with other vehicles or obstacles that can cause significant material and human damage.

In these conditions, manually following another aircraft at the correct speed and at the correct distance (with a safety distance to be observed) represents an additional workload for the pilot, and can prove difficult, even impossible, if the operational conditions are degraded (for example: reduced visibility, bad weather, wet or contaminated runway).

Moreover, even assuming the best case scenario where the pilot has an automatic taxiing function and only has to manually control the speed of the aircraft (the trajectory being followed laterally automatically), manual piloting leads to an under-use of the operational capabilities of the aircraft. In particular:

- controlled manually, the speed of the aircraft is less than it could be if it were controlled automatically, because the pilot generally prefers to be prudent and be well in control of his speed. Consequently, the overall speed of the convoy is lower;
- in terms of distance between aircraft within a convoy, the pilot, out of caution, gives himself wide safety margins, which could be calculated more accurately if automatically following the speed; and
- in cases of poor visibility conditions, this convoy following maneuver is difficult (even impossible) and potentially hazardous in manual piloting mode.

Finally, currently, there is no functional framework for ensuring the coherence of the convoy by the sharing of information between the aircraft and ground control, and between the aircraft themselves. There is also no formal operational procedure for managing convoys of aircraft, in particular the maneuvers of aircraft wanting to enter or leave the convoy. Consequently, ground control is obliged to manage each aircraft of the convoy individually, and cannot manage the convoy as a whole.

SUMMARY OF THE INVENTION

The object of the present invention is to remedy the abovementioned drawbacks. It relates to a method of controlling at least partially automatically a following aircraft taxiing on the ground within a convoy of aircraft, said convoy of aircraft comprising a coherent set of at least two aircraft which follow one another along a common trajectory, namely a lead aircraft, called leader aircraft (or leader) and at least one aircraft following it, called following aircraft.

To this end, according to the invention, said method is noteworthy in that:

- a yaw speed instruction is generated enabling the following aircraft to laterally follow a trajectory for taxiing on the ground, which is common to the aircraft of said convoy;
- a current convoy status table is received, which describes the current status of the convoy and indicates at least a longitudinal separation to be observed by said following aircraft relative to at least one aircraft preceding it in the convoy;
- using said current status table, a longitudinal speed instruction is generated enabling the following aircraft to observe said longitudinal separation relative to said aircraft preceding it; and
- using said yaw speed instruction and said longitudinal speed instruction, help is provided in controlling the following aircraft taxiing on the ground within the convoy of aircraft.

Thus, thanks to the invention, assistance is provided in controlling a following aircraft that is taxiing on the ground within the convoy of aircraft, preferably by implementing automatic piloting of the following aircraft so that it observes said yaw speed instruction and said longitudinal speed instruction.

The present invention thus provides effective assistance, at least partially automatic, in the control of a following aircraft that is part of a convoy of aircraft taxiing on the ground, in particular in an airport area. As specified hereinbelow, this control assistance makes it possible in particular to simplify the management of traffic and ensure the stability and the safety of the convoy.

In a preferred embodiment, the longitudinal speed instruction is limited by an allowable maximum speed envelope, in order in particular to observe speed, acceleration and jerk constraints, in particular so that the controlled speed does not lead to behaviors that are occasionally uncomfortable for the passengers or hazardous for the aircraft and its environment.

Furthermore, advantageously, said longitudinal speed instruction is calculated by taking into account one of the following information items:

- a separation to be observed relative to an aircraft directly preceding the following aircraft in the convoy;
- a separation to be observed relative to a leader aircraft of the convoy; and
- separations to be observed, respectively, relative to the aircraft directly preceding the following aircraft and relative to the leader aircraft.

Moreover, in the context of the present invention, said current status table includes, for each aircraft of the convoy, at least the following information:

- its rank in the convoy;
- the names of the various aircraft that make up the convoy; and
- the separation or separations to be observed.

The present invention also relates to a method of automatically managing at least one convoy of aircraft taxiing on the ground.

According to the invention, said method is noteworthy in that, for at least one of the following aircraft of said convoy, an (at least partially automatic) control method such as that mentioned above, is implemented.

In the context of the present invention, there is no need for all the following aircraft of the convoy to implement the abovementioned (preferably automatic) control method. Consequently, mixed convoys can be formed, comprising following aircraft implementing said control method according to the invention, and manually piloted aircraft. This makes it possible in particular to incorporate in the convoy aircraft that do not have means for implementing such an automatic (or semi-automatic) control mode. Obviously, such a mixed convoy is less efficient, in particular regarding speed, than a convoy in which all the following aircraft implement said automatic control method.

Nevertheless, to be able to be part of such a convoy, a following aircraft, even if it does not implement said automatic control method, must be able to exchange information with the other aircraft of the convoy and with ground control. Thus, in a preferred embodiment:

- means are providing enabling information to be exchanged between the various aircraft of the convoy concerning flight parameters of the latter, representative of individual behaviors within the convoy; and
- means are provided for exchanging information relating to the convoy as an entity, between the aircraft of the convoy and at least one control station that manages the collective behavior of the convoy.

Moreover, the leader of the convoy behaves independently. In particular, its speed does not depend on the behavior of the other members of the convoy. Said leader can be piloted automatically or semi-automatically, or manually. However, in a particular embodiment, the leader aircraft is piloted according to a speed profile that takes into account constraints that are associated with at least one following aircraft of the convoy, for example lower maximum allowable speeds or more restrictive jerk or acceleration values.

Furthermore, advantageously:

- to attach an aircraft to said convoy, an attachment point is determined which is situated on the ground and which represents the beginning of the portion of common trajectory between this aircraft and the convoy, and said aircraft is considered to be attached as soon as it has passed said attachment point; and to detach an aircraft from the convoy, a detachment point is determined which is situated on the ground and which represents the point marking the end of the portion of common trajectory between this aircraft and the convoy, and said aircraft is considered to be detached when it has passed this detachment point and is at a predetermined safety distance.

Thanks to these possibilities of attaching and detaching aircraft to and from the convoy, the following various maneuvers specified below can be implemented:

- the collection of an aircraft at the end of the convoy;
- the insertion of an aircraft at an arbitrary rank of the convoy, including at the head of the convoy;
- the extraction of an aircraft situated at an arbitrary rank, including at the head of the convoy;
- the splitting of a convoy into two distinct independent convoys; and
- the merging of two convoys into one.

The present invention also relates to a device for controlling at least partially automatically a following aircraft taxiing on the ground within a convoy of aircraft, said convoy of aircraft comprising a coherent set of at least two aircraft that follow one another along a common trajectory, namely a lead aircraft, called leader aircraft (or leader), and at least one aircraft following it, called following aircraft.

According to the invention, said device is noteworthy in that it comprises:

- means for generating a yaw speed instruction enabling the following aircraft to laterally follow a trajectory for taxiing on the ground, which is common to the aircraft of said convoy;
- means for receiving a current convoy status table, which describes the current status of the convoy and indicates at least a longitudinal separation to be observed by said following aircraft relative to at least one aircraft preceding it in the convoy;
- means for generating, using said current status table, a longitudinal speed instruction enabling the following aircraft to observe said longitudinal separation relative to said aircraft preceding it; and
- means for helping with the control of the following aircraft taxiing on the ground within a convoy of aircraft, using said yaw speed instruction and said longitudinal speed instruction.

Moreover, the present invention also relates to a system for automatically managing at least one convoy of aircraft taxiing on the ground, which is noteworthy in that it comprises:

- at least one device for controlling at least partially automatically a following aircraft, such as that mentioned above, which is mounted on one of the following aircraft of the convoy;
- means for exchanging, between the various aircraft of the convoy, information relating to flight parameters of the latter, representative of individual behaviors within the convoy, and
- means for exchanging information relating to the convoy as an entity, between the aircraft of the convoy and at least one control station that manages the collective behavior of the convoy.

The present invention therefore relates to the automatic management of convoys of aircraft on the ground and to the control of each of the aircraft within a convoy, that make it possible to remedy the abovementioned drawbacks.

An important advantage is that this automatic convoying function simplifies traffic management from the ground control point of view, because a convoy can be seen as a single entity, and not as a set of separate objects. It is simpler to indicate to an entire convoy a single destination, and to handle the convoy as a single object, than to have a set of aircraft converge toward one and the same destination, while maintaining adequate safety distances between them, avoiding the risks of collision and close contact (intersecting trajectories for example), with a timing that is fairly great to allow safety margins for these maneuvers.

Furthermore, this management function makes it possible to ensure the stability (the convoy is regulated even in the presence of disturbances) and the safety (the aircraft are careful not to move too close to or too far away from the aircraft that precedes them) of the convoy. Consequently, compared to a convoy consisting of aircraft in which the speed is piloted automatically, the automation of the speed of at least certain aircraft makes it possible to reduce the distances between aircraft, and increase the overall speed of the convoy. This reduction of the margins, which would be hazardous, even impossible, in manual piloting mode, makes it possible to create more dense convoys of aircraft, in which the aircraft are more grouped together. It is therefore possible to form longer convoys than in manual piloting mode (that is, convoys consisting of more aircraft), or, given the same number of aircraft, form shorter convoys.

Furthermore, when the servocontrol is provided automatically by the device, the pilot is relieved of all the workload corresponding to the manual piloting of the aircraft, which allows him to concentrate on other tasks, in particular monitoring the external environment (movements of the other vehicles, surrounding obstacles), or communications with air traffic/ground control. Furthermore, this automatic servocontrol can be implemented with degraded visual conditions (for example, at night) or atmospheric conditions (rain, fog, snow), which would make the job of manually piloting the following of the convoy difficult or impossible.

The abovementioned advantages mean that the use of convoys of aircraft makes it possible to increase ground traffic density, and reduce overall the occupancy times of the runways and the taxiways by the convoys. In the current context of saturation of the major international airports, increasing the traffic while maintaining an equivalent safety level is of obvious economic interest to the airlines and the airports.

The present invention also makes it possible to provide an operational and functional framework for convoy management, and for the maneuvers of aircraft that join the convoy or detach themselves from the latter. In particular, it makes it possible to codify the information exchanged, the instructions coming from ground control, the maneuvers that are allowed, and so on.

Moreover, the invention presents the benefit of being able to mix within one and the same convoy aircraft managed automatically by the function (according to the invention) and aircraft that are piloted manually (because the function is not present or is not active). It is therefore possible, during the transitional phase of progressively equipping airline fleets, to form mixed convoys. This makes it possible to retain the advantages associated with the simplification of traffic management, even if the efficiency of the mixed convoys is lower, because of the presence of manually piloted aircraft.

Furthermore, this function provides a way of ensuring flight/ground continuity for trains of aircraft. In practice, a standard function of ASAS ("Airbone Separation Assurance System") type ensures similar behaviors in flight during the approach phase (maintaining a constant time separation between two or more aircraft). A train of aircraft formed in flight can therefore continue to exist on the ground, which makes it possible to optimize the traffic and make it more fluid by grouping together several aircraft within one and the sane entity.

There are a number of possible aircraft convoy applications.

A first application relates to the possibility of forming trains of aircraft. For example:

to enable a group of aircraft to cross a runway quickly, and therefore reduce the unavailability time of the latter for take-offs and/or landings; and to manage queues that are often formed, at major airports, at the runway entry points. When a large number of aircraft have to leave at times that are close together, they must wait for the runway to be free to be able to be take off. When the leader of the convoy passes the stop bar and enters onto the runway to be aligned, it is detached from the convoy. The following aircraft then assumes the role of leader, advances to the stop bar automatically bringing the rest of the convoy with it, and so on.

A second application relates to the collection of aircraft, that is, the possibility for an aircraft, or for a convoy that is already formed, to pass close to other aircraft and attach them to the tail of the convoy. Thus, a set of aircraft can easily be collected to group them together and bring them to a given point of the airport, for example close to the entry to a runway.

Furthermore, similarly, a third application allows for the distribution of aircraft to a set of terminals. In this case, a convoy that is already formed can pass close to a set of airport terminals, and, at some of them, leave one or more of the aircraft from the convoy, considerably increasing the fluidity of the traffic.

The present invention also relates to an aircraft that includes a control device like that mentioned above.

BRIEF DESCRIPTION OF THE DRAWINGS

The figures of the appended drawing will give clear understanding of how the invention can be represented. In these figures, identical references designate similar elements.

DETAILED DESCRIPTION OF THE INVENTION

Figure 1:
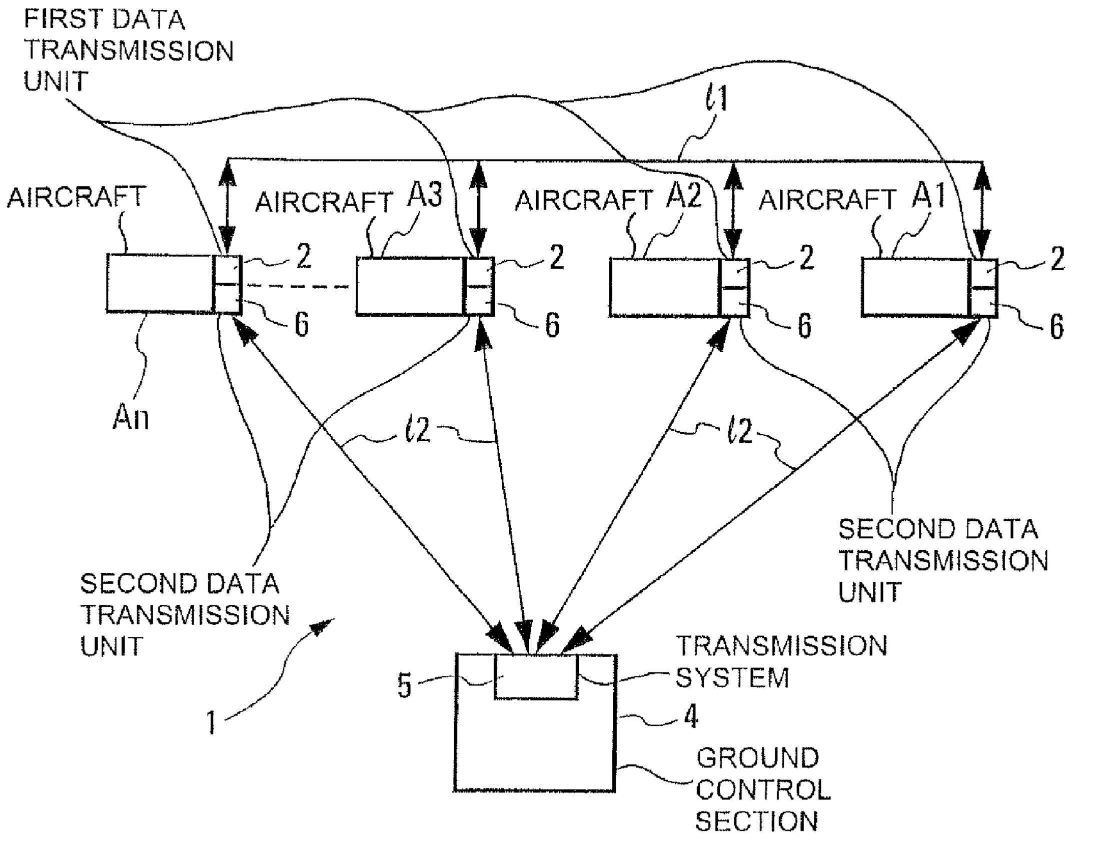
FIG. 1 is the block diagram of a system for automatically managing a convoy of aircraft, according to the invention.

The system 1 according to the invention is diagrammatically represented in FIG. 1 and is designed to manage automatically a convoy of aircraft taxiing on the ground, in particular in an airport area such as an airport or an aerodrome.

Figure 2:
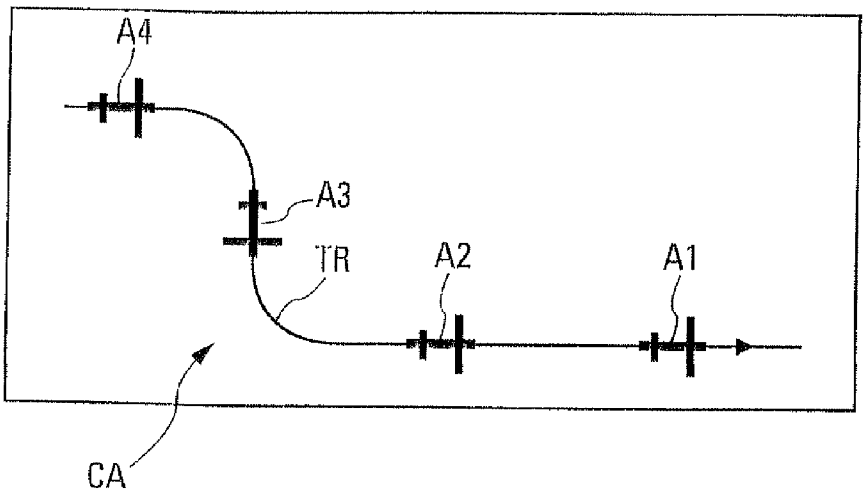
FIG. 2 diagrammatically illustrates a convoy of aircraft

In the context of the present invention, a convoy of aircraft CA is considered to be a coherent set of at least two aircraft A1, A2, A3, A4 following one another in Indian file, along a common trajectory TR for taxiing on the ground, as represented in FIG. 2. This set is considered to be coherent if the aircraft A1 to A4 of the convoy CA exchange, between them and with ground control, information making it possible to follow the trajectory TR on the ground, according to a behavior (notably in terms of speed and/or acceleration) that is suited to the stability and the safety of the convoy. This convoy CA therefore comprises a lead aircraft A1 which is called the leader aircraft (or leader) and one or more aircraft A2, A3, A4 that follow this leader aircraft A1 and that are called following aircraft. The various aircraft A1 to A4 of the convoy CA must notably observe between them particular separations, expressed in distance or in time, as specified hereinbelow.

For the convoy 1 to be coherent, said system 1 comprises, as represented in FIG. 1:

on each of the aircraft A1, A2, A3, . . . , An of the convoy CA, first data transmission means 2 which comprise standard data transmission and reception means and enable information to be exchanged between the various aircraft A1 to An of the convoy CA relating to parameters of the latter and representative of individual behaviors within the convoy, as illustrated by a link l1 in FIG. 1; and on at least one ground control station (or ground control) 4, for example a control tower of an airport, a transmission system 5 which comprises standard information transmission and reception means and which cooperates, as illustrated by links l2, with second data transmission means 6 which are mounted on the various aircraft A1 to An of the convoy CA. These second means 6 also comprise standard data transmission and reception means.

Ground control 4 schedules the convoy, and receives from each aircraft, via the means 6 and 5, or via any information technology means (for example of "DataLink" or "Wimax" type), or a radiocommunication (audio dialog between the pilot and the control station), the information relating to the status of the convoy. Conversely, each aircraft receives from ground control, via the means 5 and 6, for example at regular intervals or on a change of status of the convoy CA, the overall status of the convoy, possibly updated according to information transmitted individually by each of the aircraft of the convoy.

Two levels of information exchange, necessary to the correct operation of the convoy CA, can therefore be distinguished:

"low level" information, for example the position, the speed and the heading of each aircraft, is sent directly to the other aircraft of the convoy CA (using the means 2). The sharing of information is implemented between the aircraft, in order to ensure the individual behaviors of the convoy (individual movements of the aircraft). On an aircraft level, this data ensures the stability and the safety of the convoy; and "high level" information (convoy status) is centralized at ground control level, which is best able to manage the overall behavior of the convoy (scheduling, departures and arrivals of aircraft in the convoy, . . . ). At the convoy CA level, this data ensures the coherence of the latter.

On each aircraft A1 to An, said first and second transmission means 2 and 6 can:

either be part of one and the same (information transmission) unit;

or correspond to separate means.

According to the invention, said system 1 also comprises at least one device 10 which is mounted on one of the following aircraft A2, A3, A4 of the convoy CA. Preferably, said system 1 comprises several devices 10, each of which is mounted on a following aircraft. Such a device 10 is designed to handle a control, at least partially automatic within the convoy of aircraft, of the following aircraft on which it is mounted.

Figure 3:
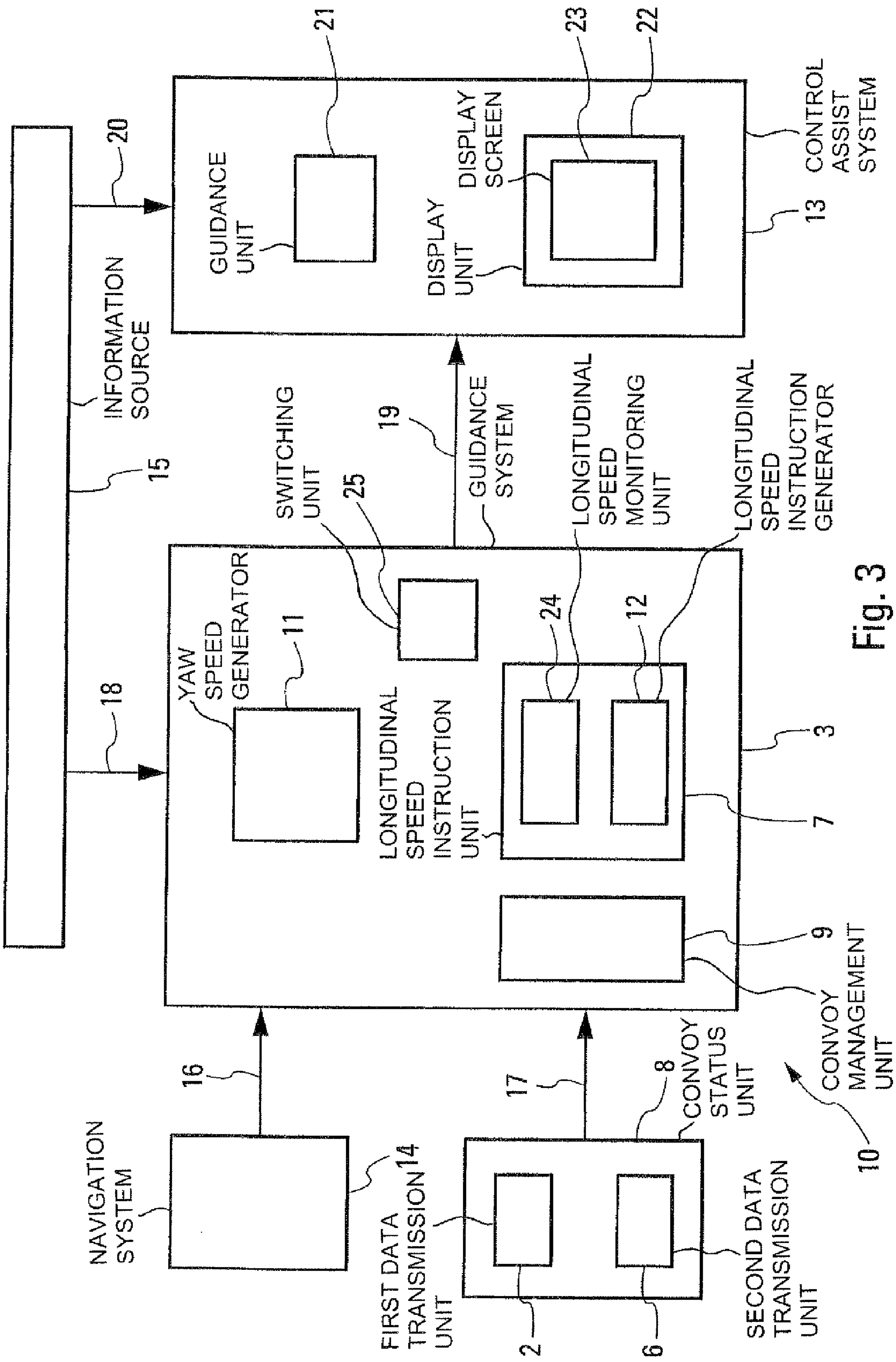
FIG. 3 is the block diagram of an automatic control device according to the invention.

According to the invention, said device 10 comprises, to this end, as represented in FIG. 3:

means 11 for automatically generating, in a standard manner, a yaw speed instruction enabling the following aircraft, on which said device 10 is mounted, to laterally follow a trajectory TR for taxiing on the ground, which is common to the aircraft of the convoy CA;

a unit 8 (comprising said means 2 and 6) for receiving in particular a current status table of the convoy detailed hereinbelow, which describes the current status of the convoy and indicates at least one longitudinal separation to be observed by said following aircraft relative to at least one aircraft preceding it in the convoy. This current status table TEC can be stored in means 9 (specified hereinbelow) that handle management of the convoy;

means 12 for using in particular said current status table to generate a longitudinal speed instruction enabling the following aircraft to observe said longitudinal separation relative to said aircraft preceding it, and a system 13 for assisting in the control of said following aircraft (that is taxiing on the ground within a convoy of aircraft), using said yaw speed instruction and said longitudinal speed instruction, generated, respectively, by the means 11 and 12.

Said means 12 calculate said longitudinal speed instruction, taking into account the following information items:

a separation to be observed (by the following aircraft equipped with the device 10) relative to the aircraft directly preceding said following aircraft in the convoy;

a separation to be observed relative to a leader aircraft A1 of the convoy; and separations to be observed, respectively, relative to the aircraft directly preceding the following aircraft and relative to the leader aircraft A1.

Said device 10 also comprises:

a standard navigation system 14 which generates in particular the trajectory TR for taxiing on the ground that the aircraft must follow; and a set 15 of information sources that determine, in a usual manner, notably the current values of a plurality of parameters such as the speed, the position and/or the heading of the aircraft.

Furthermore, said means 11 and 12 can be part of a guidance system 3 which is linked via links 16, 17, 18 and 19 respectively to said navigation system 14, to said unit 8, to said set 15 and to said system 13 (which is also linked by a link 20 to the set 15).

Said system 13 can comprise:

standard means 21 for automatically guiding the aircraft, according to said yaw speed instruction and/or said longitudinal speed instruction; and/or display means 22 which display on a display screen 23 information illustrating said yaw speed instruction and/or said longitudinal speed instruction, this information being able to be used by the pilot to pilot the aircraft.

In a particular embodiment, the means 21 can comprise, for the application of the longitudinal speed instruction:

standard control means, for example of the engines and/or of the brakes, that act on the (longitudinal) speed of the aircraft;

computation means that are intended to calculate, in a standard manner, setpoints that are likely to be applied to said control means. These setpoints are such that when applied to the control means, the latter control the aircraft according to said speed instruction; and standard means, for example actuators of the engines or of the brakes, that are formed in such a way as to apply the setpoints calculated by said computation means to said control means.

For the yaw speed instruction, the means 21 can comprise similar standard means.

The function according to the present invention that is implemented by a device 10 (in conjunction with said system 1) is hereinafter called "OGAPAS function" (OGAPAS standing for "On-Ground Aircraft Platooning Automatic System").

As detailed further hereinbelow, this OGAPAS function consists of three main subfunctions:

a convoy management subfunction (means 9), which contains:

a current status table TEC of the convoy, sent by ground control 4 (via the means 5) to all the members of the convoy and received by the means 6. This table describes the current status of the convoy;

a subfunction (integrated) for managing the convoy entry and exit maneuvers, and changes of operating mode. It also makes it possible to communicate (via the means 6) to ground control the current status of the aircraft within the convoy;

a subfunction (means 7) for generating a speed instruction. The aim of the latter is to generate a longitudinal speed instruction so as to maintain separations, in distance or in time, that are constant or parameter-dependent, with one or more other aircraft of the convoy, in order to ensure the stability and the safety of the convoy, notably by preventing any risk of close contact with the other members of the convoy. This subfunction consists of two parts:

a subfunction (means 12) for generating a longitudinal speed setpoint, from status variables of a certain number of aircraft of the convoy (including the aircraft itself), from the current status table and from a speed profile received from the navigation system 14;

a monitoring subfunction which comprises means 24 for monitoring the speed instruction generated by the means 12, so as to:

limit this instruction within the limit of the normal operational capabilities of the aircraft when the latter is in normal regulation conditions; or on the contrary, confer a speed or acceleration authority that is greater than the normal limits, when safety conditions (risks of collision for example) demand it; and a third subfunction (means 25) for changing modes, specified hereinbelow.

The generation of the speed command uses the information from a number of identical modules (incorporated in the device 10) making it possible to calculate status vectors of certain members of the convoy. In a preferred embodiment, the device 10 of an aircraft uses the status vectors of that aircraft, of the aircraft preceding it in the convoy, and of the lead aircraft, and it therefore comprises three status vector computation modules.

These computation modules use the trajectory to be followed, and measurements, in particular of position, speed and orientation (heading), to reconstruct the status vector of the aircraft. All the status vectors relate to the trajectory of the aircraft itself (because the trajectories of the other members of the convoy are unknown). For example, the lateral and angular separations of the preceding aircraft are calculated relative to the trajectory of the aircraft on which this calculation is performed, and not in relation to the trajectory followed by the preceding aircraft.

Figure 4:
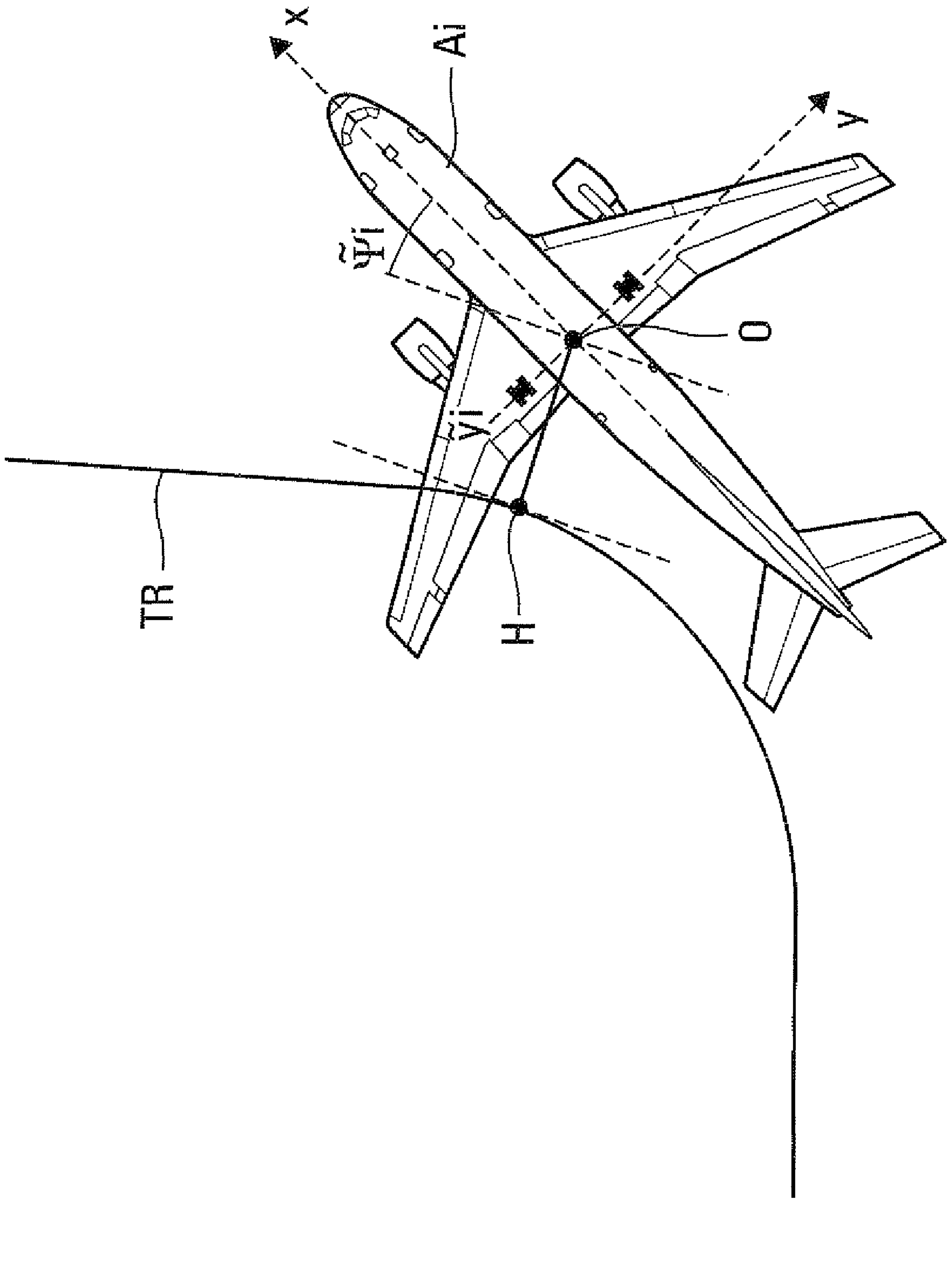
FIG. 4 diagrammatically illustrates, in plan view, the taxiing on the ground of an aircraft along a trajectory taken by a convoy.

The status vector of an aircraft Ai is called the following vector:

$$\begin{bmatrix} s_i \\ v_i \\ \tilde{y}_i \\ \tilde{\psi}_i \\ c(s_i) \\ N_i \end{bmatrix}$$

with:

$s_i$ the curvilinear abscissa on an element of trajectory $N_i$;

$v_i$: the longitudinal speed;

$\tilde{y}_i$: the lateral separation represented in FIG. 4;

$\psi_i$: the angular separation;

$c(s_i)$: the curvature of the trajectory at a target point H; and $N_i$: the current element of the trajectory TR.

In FIG. 4, O is a point of an aircraft Ai, called control point (for example, the wheel of the front landing gear, the center of gravity of the aircraft Ai or the midpoint of the main landing gears), the projection H of which along the trajectory TR is called target point. The position of the target point H along the trajectory TR is expressed in curvilinear abscissa form $s_i \cdot \tilde{y}_i$, is the distance between H and O, $\tilde{\psi}_i$ is the angular separation between the heading of the aircraft Ai and the tangent to the trajectory at H, and Oxy is a horizontal plane.

The place of each aircraft Ai within the convoy CA is given by its rank i:

for a convoy of n aircraft A1 to An, the following applies: $i \in [1,n]$ the lead aircraft A1 (or leader aircraft) is of rank i=1. It generally acts independently (from the point of view of its speed) relative to the rest of the convoy; and the following aircraft A2 to An, of rank $i \in [2,n]$, servocontrol their speed on the lead aircraft A1 and the rest of the convoy CA, so as to maintain separations (in time or in distance) that are constant between the various members of the convoy. These separations to be observed can vary from one rank to another.

One condition that is fundamental and necessary to the creation of a convoy CA is the existence of a trajectory TR common to all the members of that convoy CA. In practice, given the complexity of the environment of the aircraft on the ground [(airport traffic (other aircraft and vehicles), obstacles (buildings, panels, antennas, etc.), . . . ], the rest of the convoy is not made to follow the lead aircraft A1 along the lateral axis, but only along the longitudinal axis. Each aircraft follows its own trajectory, but servocontrols its speed so as to observe its rank and separations that are constant with one or more other members of the convoy CA. Consequently, all the aircraft must follow the same path.

For all the aircraft forming the convoy CA, the objectives of the command are therefore to follow a common path, while observing a predefined separation (in time or in space) with at least one other member of the convoy. In a preferred embodiment, it involves observing a first separation with the preceding aircraft, and a second separation with the leader aircraft A1.

In the context of the present invention, it is possible to envisage the presence, in the convoy, of following aircraft that are not equipped with the OGAPAS function implemented by the device 10, subject to certain conditions described hereinbelow. In particular, it is possible to envisage:

an aircraft equipped only with an "Auto-Taxi" function detailed hereinbelow, in which case the pilot uses an auto-lateral mode, also specified hereinbelow, and manually servocontrols its speed so as to remain in the convoy and observe the safety distances; and an aircraft piloted entirely manually (no auto-Taxi function, or such a function present but not activated), in which case the pilot must remain on the trajectory of the convoy and correctly servocontrol its speed.

The expression "status of the convoy CA" denotes a set of information, describing the current and essential characteristics of the convoy, and enabling each of the aircraft of the convoy to know its macroscopic situation. The status of the convoy must be shared by all the aircraft in the convoy, and by ground control 4.

As an example, a table such as that described hereinbelow summarizes the status of the convoy:

| Rank | Name | Auto | Attached | Di |
|---|---|---|---|---|
| 1 | AF456 | Yes | Yes | 0 |
| 2 | QT072 | Yes | Yes | 190 |
| 3 | AF725 | Yes | Yes | 180 |
| 4 | BA062 | No | No | 280 |
| 5 | IT021 | Yes | No | 200 |

With this table, each aircraft of the convoy thus has access to the following information:

its rank: this tells it whether it is leader or follower, and which aircraft it is expected to follow if appropriate;

the names of the aircraft that make up the convoy, which enables it to choose the origin of the information that it needs for longitudinal guidance. In a preferred embodiment, the aircraft IT021 will need information supplied by the aircraft BA062 situated immediately in front of it and by the lead aircraft AF456;

whether or not it has the OGAPAS function available (namely the "Auto" function in the preceding table), which makes it possible to adapt the automatic guidance, bearing in mind that the preceding or following aircraft is piloted manually;

who is or is not attached (to the convoy): this information can be used to manage the behavior of the aircraft in the attachment phase, or when an aircraft leaves the convoy; and the separation Di to be observed with the preceding aircraft (that is, the one directly preceding it), expressed, for example, in meters. This separation depends on the type and the dimensions of the aircraft and of its predecessor, on the status of the runway, on visibility, etc. For the aircraft that are piloted manually, this separation can be chosen to be greater than for the aircraft provided with the OGAPAS function, in order to provide the human pilot with a greater margin for maneuver.

A table such as that specified above is called current status table (TEC), because it characterizes the current status of the convoy CA. On a change of status (an aircraft leaves the convoy CA for example), it is essential for all the aircraft of the convoy CA to be informed of this change at the same time, for all the aircraft of the convoy to simultaneously change the description of the status of the convoy, in order to ensure the safety of the convoy.

From this table TEC, by using the information that it contains and the moment at which it is sent simultaneously to the members of the convoy, the system 1 will be able to complete various maneuvers that can arise while taxiing, in particular:

the collection of an aircraft at the end of the convoy;

the insertion of an aircraft in an arbitrary rank of the convoy (including the lead aircraft, which corresponds to a change of leader);

the extraction of an aircraft situated at an arbitrary rank (including the lead aircraft, which corresponds to a change of leader);

the splitting of a convoy into two distinct and independent convoys; and the merging of two convoys into one.

The sharing of the information concerning the status of the convoy can be managed by the aircraft themselves, by dialogs between the aircraft. However, the occasional presence in the convoy of aircraft that are not equipped with the OGAPAS function (device 10) means that it is simpler to manage the sharing of the information by centralizing the data at ground control 4 level.

Moreover, as indicated hereinabove, ground control 4 schedules the convoy, and receives from each aircraft, either by any information technology means (for example of "DataLink" or "Wimax" type), or by radio (audio dialog between the pilot and the control tower), the information relating to the status of the convoy (for example, whether it has the OGAPAS function, whether or not it is attached to the convoy, etc.). Conversely, each aircraft receives from ground control, for example at regular intervals or on a change of status of the convoy CA, the status of the convoy, possibly updated according to the information transmitted individually by each of the aircraft of the convoy.

In a particular embodiment, the OGAPAS function according to the invention is associated with an "Auto-Taxi" function. This Auto-Taxi function which is also implemented by the device 1 (using appropriate means that are not represented) is based on four modes (plus a direct mode in the event of failures), namely:

a normal manual mode, in which the pilot manually controls the aircraft by objectives (yaw speed, acceleration speed); and three managed modes:

a fully automatic mode, called "Full-Auto" (M/FA), in which the function can be used to control the aircraft without the assistance of the pilot along the chosen trajectory and according to an associated speed profile. In this mode, the pilot does not need to actuate a piloting member to direct the aircraft. The pilot can also have a visual aid representing, for example, ground guidance objectives;

a semi-automatic mode, called "Auto-Lateral" (M/AL), in which the function can be used to control the aircraft along the lateral axis, that is, it can be used to guide the aircraft along the trajectory. However, the speed of the aircraft is controlled manually by the pilot; and an assisted manual mode, called "Visual Help" (M/VH), in which the aircraft is controlled manually by the pilot (as in the normal manual modes, but in which the pilot can use a visual aid to follow both the required trajectory and the corresponding speed profile.

The OGAPAS function adds an additional mode; with the same level of automation as the M/FA mode. However, instead of following a speed profile associated with a trajectory, the aircraft is servocontrolled on the rest of the convoy.

Moreover, concerning the aircraft forming the convoy CA, two main operating modes are envisaged in the context of the present invention: a master mode, which is reserved for the leader, and a slave mode, which is used by the rest of the members of the convoy (following aircraft).

Thus, within one and the same convoy CA, only the lead aircraft A1 is in master mode. In this master mode, the aircraft A1 behaves independently. Its speed does not depend on the behavior of the other members of the convoy. However, this leader aircraft A1 can, if necessary, take account of the fact that other aircraft servocontrol their speed on their own, in order to limit its own maximum speed, so as not to distance the rest of the convoy.

The leader is, from the point of view of the Auto-Taxi function, preferably in "Full-Auto" mode (M/FA), but there is no constraint preventing the leader from being in a less automatic mode ["Auto-Lateral" (M/AL) or "Visual Help" (M/VH)], even in normal mode. It is even possible to envisage a leader not equipped with the OGAPAS function, or with the Auto-Taxi function, and therefore in a virtual master mode.

In M/FA mode, the leader follows its generated speed profile without worrying about the rest of the convoy. On the other hand, the generation of the speed profile of the leader can incorporate certain additional constraints associated with the aircraft that make up the convoy, for example lower maximum allowable speeds, or even more restrictive jerk or acceleration values.

Furthermore, the slave mode is dedicated to the following aircraft. Their speed is locked according to the behavior of the convoy, thanks to the longitudinal speed control specific to the OGAPAS function. For this, the Auto-Taxi function must be present and active, in order for:

the lateral following of the trajectory to be handled automatically by the Auto-Taxi function; and the speed profile associated with the trajectory to be available.

In practice, in order to observe its own constraints, notably speed, acceleration and jerk, each aircraft equipped with the device 1 must limit (using the means 24) the speed calculated by the longitudinal command of the OGAPAS function by an envelope of maximum allowable speeds. Thus, the controlled speed does not lead to behaviors that are potentially uncomfortable for the passengers or hazardous for the aircraft and its environment.

The automatic following of a following aircraft can be done in fully automatic mode, or even in M/AL or M/VH mode. It is also possible to envisage, in certain conditions, a following aircraft being piloted entirely manually, in which case the aircraft is in a virtual slave mode.

By default, the M/FA mode is that of the Auto-Taxi function, that is, the aircraft is in master M/FA mode. When the conditions of activation of the OGAPAS function are satisfied, there is a switch to the slave M/FA mode thanks to a subfunction (means 25) of the OGAPAS function which will be responsible for switching between the longitudinal guidance law of the Auto-Taxi function and that of the OGAPAS function (means 7).

Moreover, the transitions to less automated modes are always possible, and operate in the same way as for the Auto-Taxi function. In slave M/FA mode, an action on a longitudinal piloting member, or a disconnection of the autothrottle (A/THR) switches the aircraft to M/AL mode, in which the speed is controlled manually by the pilot. Similarly, an action on a lateral piloting member, or a disconnection of the automatic pilot (A/P) switches the aircraft directly to M/VH mode. Thus, the modal behavior remains consistent with the architecture of the existing Auto-Taxi function.

Among the conditions of engagement in slave mode of the OGAPAS function, when using both the Auto-Taxi and OGAPAS functions, it is worth mentioning:

the Auto-Taxi function must be active and in M/FA mode;

the OGAPAS function needs to have received from ground control a current status table TEC of the convoy which is valid;

the aircraft must have a rank greater than or equal to 2 in the convoy. The lead aircraft A1 in effect remains in master mode; and the various communications between aircraft (positions, speeds, etc.) and with ground control (status of the convoy) must function.

In case of the combined use of the Auto-Taxi and OGAPAS functions, the means 25 that implement a change-of-mode subfunction, controlled by the mode management subfunction (means 9), will be responsible for sending to a ground protection envelope either the speed instruction obtained from the Auto-Taxi function when the current mode is the master mode, or the speed instruction obtained from the OGAPAS function when the current mode is the slave mode. The speed instruction obtained from the ground protection envelope is then sent to the speed piloting function (means 13).

It is possible to envisage the participation in the convoy CA of aircraft that are not equipped with the OGAPAS function, regardless of the rank of the convoy. The Auto-Taxi function is no longer mandatory.

In certain conditions described hereinbelow, the convoy can include, or be controlled by, an aircraft that is piloted manually and/or that does not have any function for automating control on the ground (for example, Auto-Taxi, OGAPAS and other functions).

The present invention can be implemented with a fleet of mixed aircraft (that is, some have the OGAPAS function, others do not). It is therefore possible to create convoys of aircraft even if certain aircraft in the convoy are not equipped with the OGAPAS function and are piloted manually. For this, a certain number of conditions are required:

visibility conditions. Generally, the formation of mixed convoys cannot be considered when the visibility is reduced, notably at night, in cases of unfavorable atmospheric conditions (snow, fog, heavy rain, etc.). In practice, manual piloting in order to follow the convoy can prove particularly difficult and lead to hazardous situations; and communications between aircraft and with ground control:

"low-level" communications: being capable of communicating, at regular intervals and through information technology means, the status of the aircraft (position, speed, heading, etc.); and "high-level" communications: being capable of informing ground control, via data links or more simply by radio, of the status of the aircraft within the convoy and of being informed in return of the status of the convoy as a whole.

All the functions for automating control on the ground can be handled manually by the pilot, by adapting certain safety values, for example by increasing the minimum distance to be observed between the aircraft of the convoy.

The ideal situation is, of course, a convoy made up of only aircraft equipped with a device 10. A majority that mostly comprises aircraft not equipped with a device 10 is of no real interest compared to an entirely manual convoy. In practice, the presence of aircraft that are not equipped reduces the efficiency that can be obtained with an entirely automatic convoy, notably in terms of maximum speed of the convoy, separations between the aircraft, reactivity, safety, response time, etc.

Moreover, in order to ensure the stability of the convoy (avoid accordian-type oscillations for example), each aircraft that is not equipped with a device 10 may be required to be bracketed at the very least by two aircraft that are so equipped.

As indicated previously, the various possible maneuvers are:

collection of an aircraft at the end of the convoy CA;

insertion of an aircraft at an arbitrary rank in the convoy (including the lead aircraft, which corresponds to a change of leader);

extraction of an aircraft situated at an arbitrary rank in the convoy (including the lead aircraft, which also corresponds to a change of leader);

splitting of a convoy into two separate and independent convoys; and merging of two convoys into one.

The term "collection phase" is used to mean the transitional phase during which a following aircraft is attached to the rest of the convoy, that is, it is placed, from a trajectory that meets that of the convoy, behind the aircraft previously situated at the tail of the convoy. It is assumed that the following conditions are satisfied:

the leader aircraft and the following aircraft have been designated by ground control. Consequently, the respective rank of each within the convoy is known, and the rest of the convoy is already formed. The aircraft wanting to be attached to the convoy is in a priori any initial position and orientation;

the aircraft to be attached is not initially on the trajectory of the convoy. On the other hand, it is assumed that both have at least a common trajectory portion TR (otherwise, they could not correctly form the convoy);

the information relating to the intentions of the various members of the convoy is a matter for ground control which assigns the aircraft of trajectories that are consistent with the convoy-formation objective; and each aircraft has only a limited awareness of its environment, and has only the position, the speed and the heading of the aircraft that precedes it and to which it must be attached (as well as the position, the speed and the heading of the lead aircraft for guidance purposes). In particular, each aircraft does not know the trajectory that the other aircraft of the convoy must follow.

Figure 5:
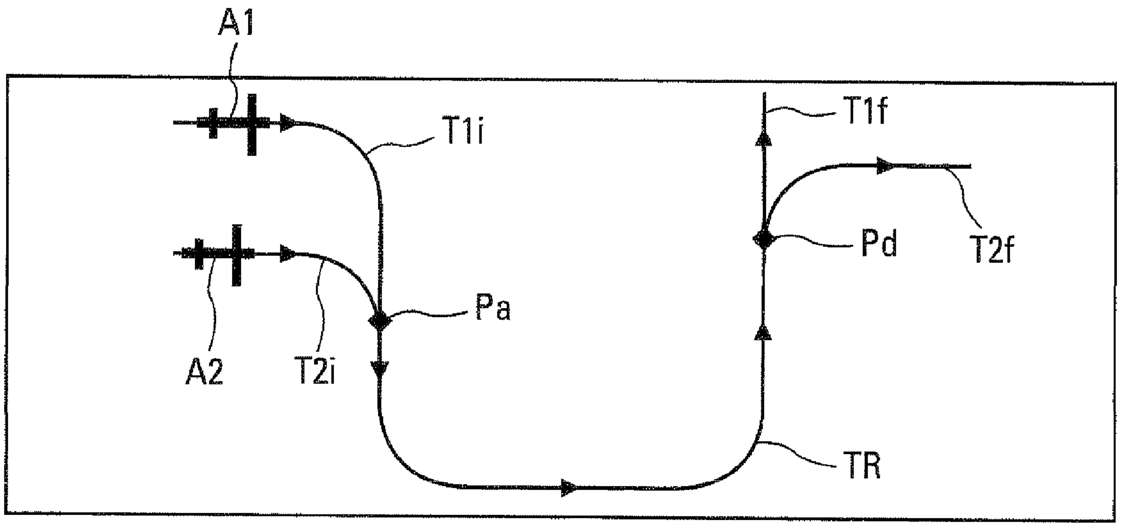
FIGS. 5 and 6 specify attachment and detachment points taken into account in the context of the present invention.
Figure 6:
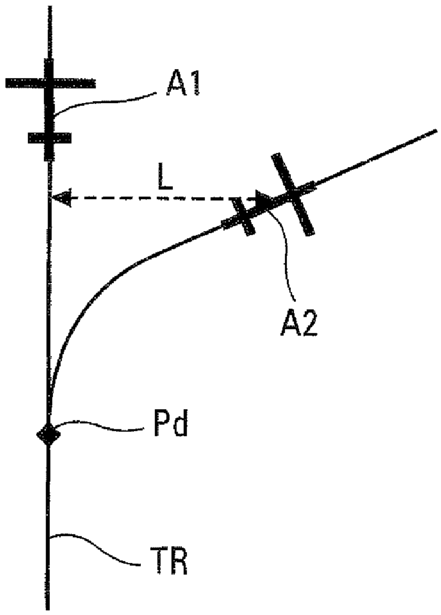

In the context of the present invention:

the term "attachment point Pa" is used to mean the point marking the beginning of the common trajectory portion TR, as represented for two aircraft A1 and A2 in FIG. 5. These aircraft A1 and A2 respectively present different initial trajectories T1*i* and T2*i*;

the term "detachment point Pd" is used to mean the point marking the end of the trajectory portion TR common to both aircraft A1 and A2 which then respectively follow different trajectories T1*f* and T2*f*;

the aircraft A2 is assumed to be attached to the convoy when it has passed the attachment point Pa; and the aircraft A2 is considered to be detached from the convoy when it has passed the detachment point Pd and it is at a safety distance L from the trajectory T1*f* being followed by the aircraft A1, as represented in FIG. 6. This distance provides an assurance that, when the aircraft A2 is considered to be detached from the convoy, it cannot hamper the latter.

The aircraft A2 can, knowing the position of the aircraft A1, determine whether the latter is or is not on a portion of its own trajectory. Specifically, this amounts to determining whether the aircraft A1 has passed the point Pa, the beginning of the trajectory portion TR common to both aircraft A1 and A2, in which case the aircraft A2 can commence the collection phase.

The collection phase obviously presupposes that the aircraft A2 is initially upstream of the point Pa. Otherwise, the convoy may not be formed correctly, particularly if the aircraft A1 is itself upstream of said attachment point Pa.

Figure 7:
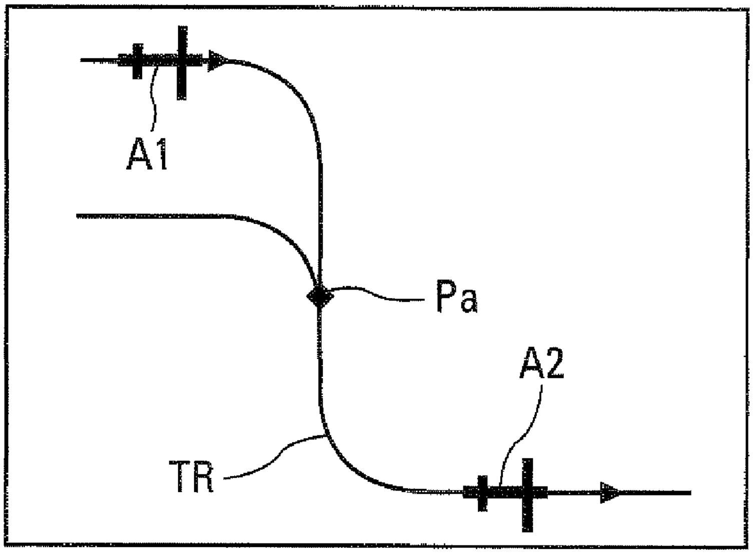
FIGS. 7 to 14 illustrate different maneuvers likely to be implemented in the context of the present invention.
Figure 8:
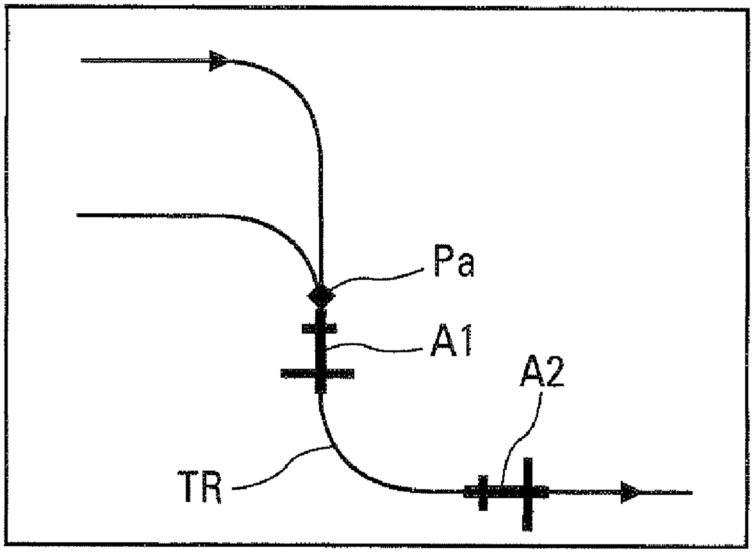

In the examples of FIGS. 7 and 8, the convoys cannot be formed correctly, because:

- in the example of FIG. 7, the aircraft A2 is already engaged on the common trajectory portion TR, whereas the aircraft A1 is not yet so engaged; and
- in the example of FIG. 8, the two aircraft A1 and A2 are on the common trajectory point TR, but in the wrong order.

The aircraft A2 cannot compare the planned trajectory of the aircraft A1 to its own to determine the point Pa (since it does not known it). On the other hand, it can determine the separations (lateral and angular) of the aircraft A1 relative to its own trajectory. When these separations meet certain criteria, the attachment phase can commence.

For this, the device 1 of the following aircraft A2 has appropriate means making it possible to determine the following elements:

- $N_1$: number of the current element of the aircraft A1 on the trajectory of the following aircraft, that is, of the aircraft A2;
- $\tilde{y}_1$: lateral separation of the aircraft A1 relative to the trajectory of the aircraft A2;
- $\tilde{\psi}_1$: angular separation of the aircraft A1 relative to the trajectory of the aircraft A2; and
- $s_1$: standardized curvilinear abscissa of the aircraft A1 on the element $N_1$.

One possible criterion for determining the beginning of the collection phase can be formulated as follows:

$$\begin{cases} s_1 \geq 0 \\ |\tilde{y}_1| \leq \tilde{y}_{seuil} \\ |\tilde{\psi}_1| \leq \tilde{\psi}_{seuil} \\ N_1 > N_2 \text{ or } (N_1 = N_2 \text{ and } s_1 > s_2) \end{cases}$$

The first three criteria ensure that the aircraft A1 is indeed on the trajectory of the aircraft A2, and is oriented correctly relative to the latter, and the fourth criterion ensures that the aircraft A1 is indeed in front of the aircraft A2. $\tilde{y}_1$ and $\tilde{\psi}_1$ are compared to threshold values that are predetermined. $N_2$ is the number of the current element of the aircraft A2.

Thus, when the aircraft A2 detects that the preceding aircraft (in this case, the aircraft A1, or indeed the aircraft at the tail of the convoy in the general case) follows the same trajectory as it, and is indeed downstream, it can switch to the guidance law of the OGAPAS function aiming to regulate its speed so as to maintain constant separations with the aircraft preceding it and/or with the lead aircraft.

Moreover, the criteria for determining a detachment point Pd is similar to the preceding criterion. It is assumed that the aircraft has passed the point Pd when:

$$\begin{cases} |\tilde{y}_1| > \tilde{y}_{seuil} \\ |\tilde{\psi}_1| > \tilde{\psi}_{seuil} \end{cases}$$

Figure 9:
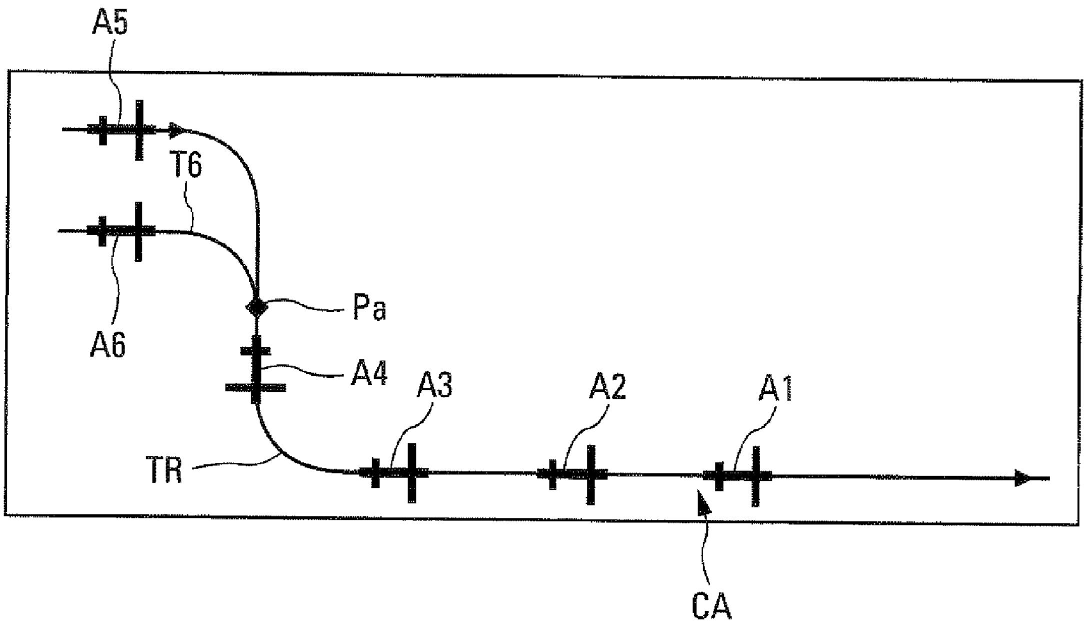
Figure 10:
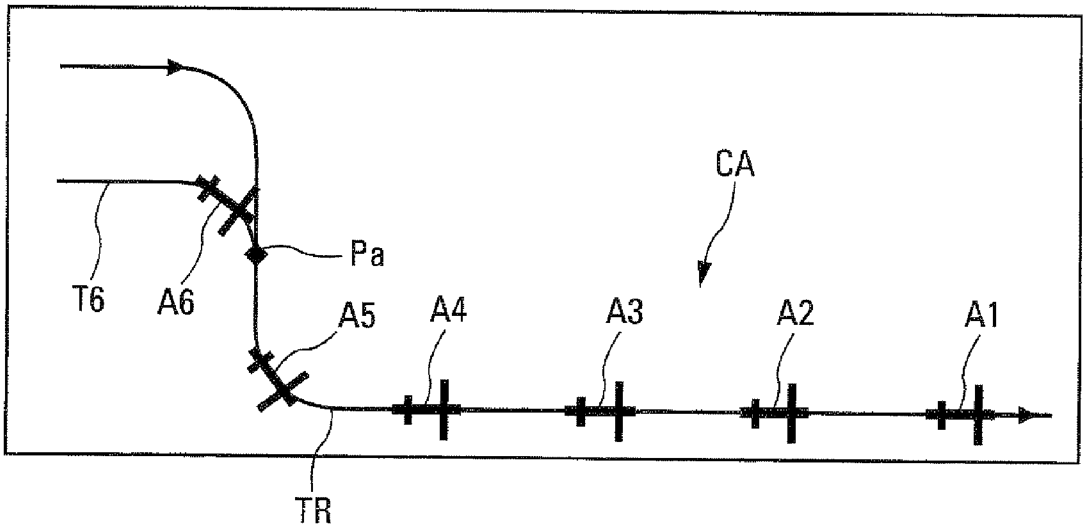

In an example represented in FIGS. 9 and 10, an aircraft A6 needs to be attached to the end of a convoy CA formed by aircraft A1 to A5. In the situation of FIG. 9, the aircraft A5 at the tail of the convoy CA has not yet passed the attachment point Pa, and the aircraft A6 is therefore waiting. In the situation of FIG. 10, the aircraft A5 has passed the attachment point Pa and the aircraft A6 begins to be regulated relative to the convoy CA by using information from the aircraft A1 to A5.

In this example, before ground control 4 decides to attach the aircraft A6 to the convoy, the aircraft A1 to A5 receive the following current status table TEC (it is assumed in this example that all the aircraft are in automatic mode):

Current status table

| Rank | Name | Auto | Attached | Di |
|---|---|---|---|---|
| 1 | A1 | Yes | Yes | 0 |
| 2 | A2 | Yes | Yes | D2 |
| 3 | A3 | Yes | Yes | D3 |
| 4 | A4 | Yes | Yes | D4 |
| 5 | A5 | Yes | Yes | D5 |

It is assumed that the aircraft A6 is in position to attach the convoy CA, that is, that it is stopped on a trajectory T6 close to that TR of the convoy CA and it is not hampering it. When ground control decides to attach the aircraft A6 to the convoy CA, it sends the following new table TEC to all the aircraft, including to the aircraft A6:

Current status table

| Rank | Name | Auto | Attached | Di |
|---|---|---|---|---|
| 1 | A1 | Yes | Yes | 0 |
| 2 | A2 | Yes | Yes | D2 |
| 3 | A3 | Yes | Yes | D3 |
| 4 | A4 | Yes | Yes | D4 |
| 5 | A5 | Yes | Yes | D5 |
| 6 | A6 | Yes | No | D6 |

The lead aircraft A1 now knows that a new aircraft A6 has just arrived, which can possibly affect its pace, in order to allow time for the arriving aircraft A6 to be attached in correct conditions.

When the last aircraft A5 of the convoy CA passes the attachment point Pa, the aircraft A6 switches to its regulation law suited to convoy-following, and informs ground control that it is in the process of joining the end of the convoy:

Current status table

| Rank | Name | Auto | Attached | Di |
|---|---|---|---|---|
| 1 | A1 | Yes | Yes | 0 |
| 2 | A2 | Yes | Yes | D2 |
| 3 | A3 | Yes | Yes | D3 |
| 4 | A4 | Yes | Yes | D4 |
| 5 | A5 | Yes | Yes | D5 |
| 6 | A6 | Yes | In progress | D6 |

When the aircraft A6 in turn passes the point Pa, it is attached to the convoy. It informs ground control of this and ground control sends a new table TEC:

| Current status table | | | | |
|---|---|---|---|---|
| Rank | Name | Auto | Attached | Di |
| 1 | A1 | Yes | Yes | 0 |
| 2 | A2 | Yes | Yes | D2 |
| 3 | A3 | Yes | Yes | D3 |
| 4 | A4 | Yes | Yes | D4 |
| 5 | A5 | Yes | Yes | D5 |
| 6 | A6 | Yes | Yes | D6 |

The collection operation is a particular case of a more general maneuver consisting in incorporating an aircraft at an arbitrary rank in the convoy.

Figure 11:
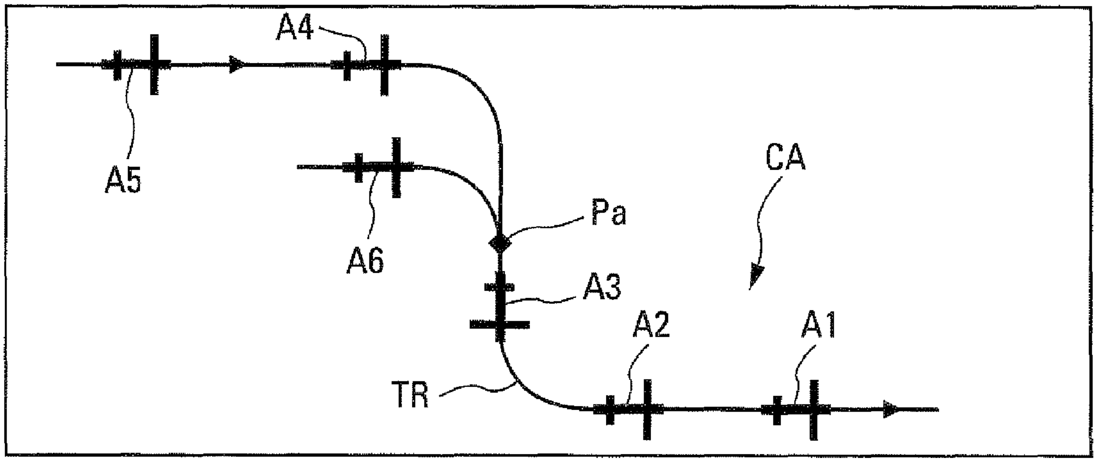

Returning to the preceding example, it is now assumed that the aircraft A6 wants to join the convoy at rank 4, that is, be placed between the aircraft A3 and A4, as represented in FIG. 11.

The status of the convoy before the arrival of the aircraft A6 is given by the following table TEC:

| Current status table | | | | |
|---|---|---|---|---|
| Rank | Name | Auto | Attached | Di |
| 1 | A1 | Yes | Yes | 0 |
| 2 | A2 | Yes | Yes | D2 |
| 3 | A3 | Yes | Yes | D3 |
| 4 | A4 | Yes | Yes | D4 |
| 5 | A5 | Yes | Yes | D5 |

When the aircraft A6 is in a waiting position and ready to join the convoy, ground control sends the following table TEC to all the aircraft of the convoy:

| Current status table | | | | |
|---|---|---|---|---|
| Rank | Name | Auto | Attached | Di |
| 1 | A1 | Yes | Yes | 0 |
| 2 | A2 | Yes | Yes | D2 |
| 3 | A3 | Yes | Yes | D3 |
| 4 | A6 | Yes | No | D6 |
| 5 | A4 | Yes | Yes | Max (2 × D4, D4 + D6) |
| 6 | A5 | Yes | Yes | D5 |

This new table indicates that the new arrival will be placed at rank 4. Consequently, the aircraft A4 (which is now in rank 5), knows that an aircraft will have to be placed in front of it. Ground control can, if necessary, ask it to double its distance to be maintained with the preceding aircraft, in order to allow the aircraft A6 that is arriving to join the trajectory TR of the convoy without being hampered. When the aircraft A3 passes the attachment point Pa, the aircraft A6 informs ground control thereof and commences joining the convoy by following its trajectory, and by being locked to the aircraft A1 and A3. The new table TEC sent by ground control to all of the convoy is therefore:

| Current status table | | | | |
|---|---|---|---|---|
| Rank | Name | Auto | Attached | Di |
| 1 | A1 | Yes | Yes | 0 |
| 2 | A2 | Yes | Yes | D2 |
| 3 | A3 | Yes | Yes | D3 |
| 4 | A6 | Yes | In progress | D6 |
| 5 | A4 | Yes | Yes | Max (2 × D4, D4 + D6) |
| 6 | A5 | Yes | Yes | D5 |

In order not to interfere with the arriving aircraft A6, the aircraft A4 stops (also leading to the stopping of the rest of the convoy that follows it), because the words "In progress" appear, which leaves place within the convoy for the incoming aircraft A6. When the aircraft A6 has finished its joining maneuver and it is considered to be attached to the convoy (that is, it has passed the attachment point Pa), the aircraft A6 informs ground control thereof, which then sends a new status table, indicating that the convoy can be regulated normally:

| Current status table | | | | |
|---|---|---|---|---|
| Rank | Name | Auto | Attached | Di |
| 1 | A1 | Yes | Yes | 0 |
| 2 | A2 | Yes | Yes | D2 |
| 3 | A3 | Yes | Yes | D3 |
| 4 | A6 | Yes | Yes | D6 |
| 5 | A4 | Yes | Yes | D4 |
| 6 | A5 | Yes | Yes | D5 |

Since the aircraft A6 is now correctly attached to the convoy, the aircraft A4 can be socked onto the aircraft A1 and A6, by notably observing the initial separation D4 to be followed.

It will be noted that, in the case where the new aircraft arrives in the lead position, the behavior of the convoy remains the same. The only separation is that the aircraft that is inserted does not switch to slave mode, but remains in master mode (Auto-Taxi function or manual mode).

Figure 12:
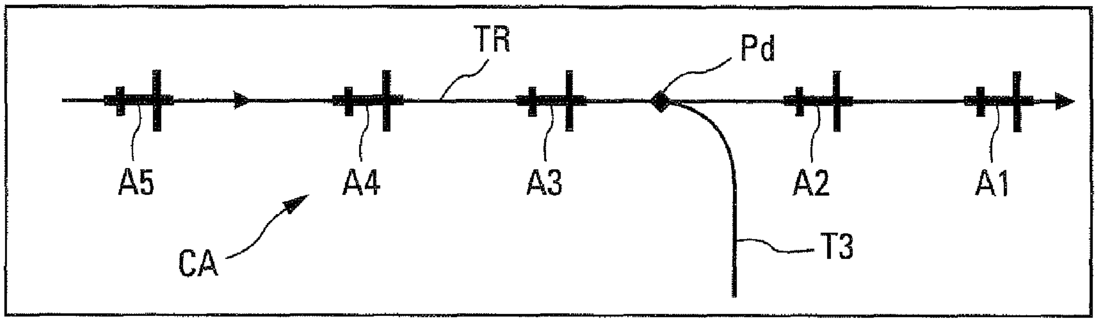

The reverse situation, corresponding to the removal of an aircraft A3 from the convoy CA (represented in FIG. 12), is very similar to the preceding case. The starting point is the following table TEC:

| Current status table | | | | |
|---|---|---|---|---|
| Rank | Name | Auto | Attached | Di |
| 1 | A1 | Yes | Yes | 0 |
| 2 | A2 | Yes | Yes | D2 |
| 3 | A3 | Yes | Yes | D3 |
| 4 | A4 | Yes | Yes | D4 |
| 5 | A5 | Yes | Yes | D5 |

It is assumed that the aircraft A3 has to leave the convoy.

When the aircraft A3 detects that the aircraft A2 has passed the detachment point Pd, it informs ground control thereof to indicate to it that it will soon assume a trajectory T3 that is different from that TR of the convoy CA (because it has seen that the aircraft A2 that precedes it is visibly taking a different path). The new table TEC sent by ground control to the convoy is then as follows:

| Current status table | | | | |
|---|---|---|---|---|
| Rank | Name | Auto | Attached | Di |
| 1 | A1 | Yes | Yes | 0 |
| 2 | A2 | Yes | Yes | D2 |
| 3 | A3 | Yes | In progress | D3 |
| 4 | A4 | Yes | Yes | D4 |
| 5 | A5 | Yes | Yes | D5 |

The aircraft A4 that follows it is then locked on the aircraft A3 (unlike in the previous case where, in the "in progress" phase, it was locked on the aircraft two ranks in front of it). Since the aircraft A3 is taking a trajectory T3 that differs from that TR of the convoy CA, the guidance law of the aircraft A4 will send a reduced speed instruction (or zero speed instruction if the aircraft A3 takes a trajectory perpendicular to that of the convoy CA), in order to leave space for the aircraft A3 to leave in total safety.

When the aircraft A3 detects that it is no longer attached to the convoy (it has passed the detachment point Pd and is no longer hampering the convoy), it informs ground control thereof, which sends a new table TEC to the remaining convoy, in which the aircraft A3 no longer appears:

| Current status table | | | | |
|---|---|---|---|---|
| Rank | Name | Auto | Attached | Di |
| 1 | A1 | Yes | Yes | 0 |
| 2 | A2 | Yes | Yes | D2 |
| 3 | A4 | Yes | Yes | D4 |
| 4 | A5 | Yes | Yes | D5 |

The aircraft A4 then automatically locks itself on the aircraft A1 and the aircraft A2, and thus makes up the empty space left by the departure of the aircraft A3.

It should be noted that the safety of the convoy CA is always assured, in particular in the case where the outgoing aircraft A3 is stopped just at the edge of the trajectory. In practice, the longitudinal guidance law of the aircraft A4 maintains a safety distance with the outgoing aircraft A3 as long as the latter is considered to be attached to the convoy CA. In the case where the outgoing aircraft A3 indicates that it has left the convoy (the aircraft A4 is then locked on the aircraft A2) whereas in reality it is still hampering the convoy, this potentially hazardous situation (because the guidance law no longer takes account of the outgoing aircraft A3, and therefore no longer manages the risks of collision with the latter) is managed in the usual manner by a ground anti-close contact function, which assumes control and starts to monitor the aircraft A3 from the moment when the latter indicates it has left the convoy. The outgoing aircraft A3 is therefore continually monitored by an anti-close contact system, whether by that incorporated in the OGAPAS function or indeed by that of the ground anti-close contact function.

Furthermore, in the case where the outgoing aircraft is the leader A1, the behavior of the convoy CA remains the same. The only separation is that the aircraft A2 which was at rank 2 changes to leader, and switches from the slave mode to the master mode (Auto-Taxi function or manual mode).

Figure 13:
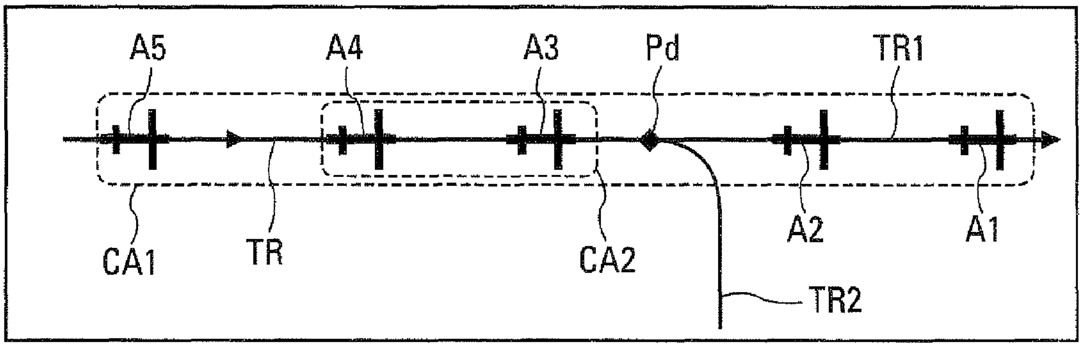

It is also possible to envisage the case where the convoy CA must be split into two distinct convoys CA1, CA2, each taking a different path TR1, TR2 at the detachment point Pd, as represented in FIG. 13.

This maneuver is a generalization of extraction from the convoy, the separation being that, at the end of the maneuver, there are two distinct convoys CA1 and CA2, and not just one as in the preceding case.

The convoy CA1, consisting of five aircraft A1 to A5, contains a sub-convoy CA2 (consisting of the aircraft A3 and A4), the trajectory TR2 of which differs from that TR1 of the convoy CA1 from the detachment point Pd. The initial status of the convoy is as follows:

| Current status table | | | | |
|---|---|---|---|---|
| Rank | Name | Auto | Attached | Di |
| 1 | A1 | Yes | Yes | 0 |
| 2 | A2 | Yes | Yes | D2 |
| 3 | A3 | Yes | Yes | D3 |
| 4 | A4 | Yes | Yes | D4 |
| 5 | A5 | Yes | Yes | D5 |

At the moment when the aircraft A2 passes the point Pd, the aircraft A3 detects it and informs ground control thereof, which now knows that the convoy CA2 must leave the convoy CA1, and sends the following table TEC:

| Current status table - Convoy CA1 | | | | |
|---|---|---|---|---|
| Rank | Name | Auto | Attached | Di |
| 1 | A1 | Yes | Yes | 0 |
| 2 | A2 | Yes | Yes | D2 |
| 3 | A3 | Yes | In progress | D3 |
| 4 | A4 | Yes | In progress | D4 |
| 5 | A5 | Yes | Yes | D5 |

There are now two convoys nested within each other. When the tail aircraft of the convoy CA2, namely the aircraft A4, detects that it is no longer attached to the convoy CA1, and therefore that there is no longer any risk of collision, notably with the aircraft A5, it informs ground control thereof, which updates the status tables:

| Current status table - Convoy CA1 | | | | | Current status table - Convoy CA2 | | | | |
|---|---|---|---|---|---|---|---|---|---|
| Rank | Name | Auto | Attached | Di | Rank | Name | Auto | Attached | Di |
| 1 | A1 | Yes | Yes | 0 | 1 | A3 | Yes | Yes | 0 |
| 2 | A2 | Yes | Yes | D2 | 2 | A4 | Yes | Yes | D4 |
| 3 | A5 | Yes | Yes | D5 | | | | | |

The two convoys CA1 and CA2 are therefore detached in total safety, and can continue their own trajectories TR1, TR2 independently.

It will be noted that the case where the two convoys are not nested is a particular case, simpler than the case described previously.

Figure 14:
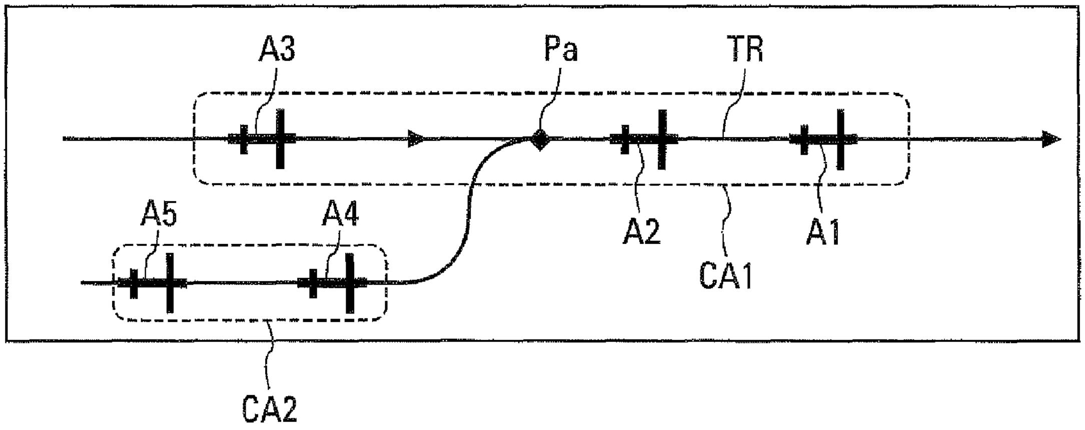

Moreover, in the example of FIG. 14, at the start there are two separate convoys CA1 and CA2, and they are to be merged so as to have only a single leader A1.

In this case, the starting point is the following tables:

| Current status table - Convoy CA1 | | | | | Current status table - Convoy CA2 | | | | |
|---|---|---|---|---|---|---|---|---|---|
| Rank | Name | Auto | Attached | Di | Rank | Name | Auto | Attached | Di |
| 1 | A1 | Yes | Yes | 0 | 1 | A4 | Yes | Yes | 0 |
| 2 | A2 | Yes | Yes | D2 | 2 | A5 | Yes | Yes | D5 |
| 3 | A3 | Yes | Yes | D3 | | | | | |

This maneuver generalizes the insertion of an aircraft within a convoy. When the convoy CA2 is in a waiting position and is ready to include the convoy CA1, at the level of rank 3 for example, ground control sends to the aircraft of the convoy CA1 the following table TEC:

| Current status table - Convoy CA1 | | | | |
|---|---|---|---|---|
| Rank | Name | Auto | Attached | Di |
| 1 | A1 | Yes | Yes | 0 |
| 2 | A2 | Yes | Yes | D2 |
| 3 | A4 | Yes | No | D4 |
| 4 | A5 | Yes | No | D5 |
| 5 | A3 | Yes | Yes | Max(3 × D3, D3 + D4 + D5) |

When the aircraft A4 detects that the aircraft A2 is passing the attachment point Pd, it informs ground control thereof, which sends the new table to the five aircraft, which now form a single convoy:

| Current status table | | | | |
|---|---|---|---|---|
| Rank | Name | Auto | Attached | Di |
| 1 | A1 | Yes | Yes | 0 |
| 2 | A2 | Yes | Yes | D2 |
| 3 | A4 | Yes | In progress | D4 |
| 4 | A5 | Yes | In progress | D5 |
| 5 | A3 | Yes | Yes | Max(3 × D3, D3 + D4 + D5) |

In order not to collision with the tail aircraft A5 of the old convoy CA2, the aircraft A3 stops (also leading to the stopping of the rest of the convoy that follows it), because the words "In progress" appear, which allows space within the convoy for the incoming aircraft. When the aircraft A4 and A5 have finished their joining maneuver and they are considered to be attached to the convoy, they inform ground control thereof, which sends a new status table, indicating that the convoy can be regulated normally:

| Current status table | | | | |
|---|---|---|---|---|
| Rank | Name | Auto | Attached | Di |
| 1 | A1 | Yes | Yes | 0 |
| 2 | A2 | Yes | Yes | D2 |
| 3 | A4 | Yes | Yes | D4 |
| 4 | A5 | Yes | Yes | D5 |
| 5 | A3 | Yes | Yes | D3 |

Since the aircraft A3 and A4 are now correctly attached to the convoy, the aircraft A3 can be locked on the aircraft A1 and A5, observing in particular the initial separation D3 to be followed.

From the point of view of the aircraft A3, the maneuver proceeds as follows:

- initially, it is locked on the aircraft A1 and A2;
- when the new table arrives, it is still locked on the aircraft A1 and A2 (despite the arrival of the aircraft A4 and A5 in the convoy), and increases its safety distance to Max (3×D3,D3+D4+D5);
- when the aircraft A2 passes the attachment point Pd, the "Attached" field for the aircraft A4 and A5 changes to "in progress", and the aircraft A3 stops; and
- when the field changes to "Yes", it is locked on the aircraft A1 and A5, and the convoys are correctly merged.

The case where the two convoys are not nested one within the other is a particular case, simpler than the case described previously. In such a situation, the two convoys are simply concatenated:

- for the aircraft of the front convoy, the situation does not change;
- for the aircraft of the rear convoy, the new leader is the leader of the front convoy; and
- the old leader (of the convoy that was behind) is locked on the leader and on the aircraft at the tail of the front convoy.

Moreover, in the case where at least one aircraft performing a maneuver (insertion, removal) is piloted manually, it is essential for the pilot of this aircraft to communicate its own situation to ground control, for example:

- in the case of an insertion, it can send a message of the type: "aircraft Ai has just passed the attachment point, I will begin my insertion as soon as possible". When ground control has notified the convoy with the words "In progress" for the incoming aircraft, it authorizes the latter to perform its maneuver; and
- in the case of an extraction, it can send a message of the type: "the aircraft Ai has just passed the detachment point, I am leaving the convoy". Ground control notifies the convoy with the words "In progress" for the outgoing aircraft. When the pilot has disengaged his aircraft and no longer presents a danger for the convoy, he informs ground control thereof by radio, which can then change the status table of the convoy.

Generally, when there are aircraft piloted manually in the convoy, the safety of the convoy is assured by the pilots and ground control.

The present invention therefore relates to the automatic management of convoys of aircraft on the ground and of the control of each of the aircraft within a convoy.

An important advantage is that the system 1 simplifies the management of the traffic from the ground control point of view, because a convoy can be seen as a single entity, and not as a set of distinct objects. It is simpler to indicate a single destination to an entire convoy, and to treat this convoy as a single object, than to have a set of aircraft converge towards one and the same destination, while maintaining sufficient safety distances between them, avoiding the risks of collision and close contact (trajectories that intersect for example), with fairly lengthy timing to allow safety margins for these maneuvers.

Furthermore, the system 1 ensures the stability (the convoy is regulated even in the presence of disturbances) and the safety (the aircraft are careful not to become too close to or distant from the aircraft that precedes them) of the convoy. Consequently, compared to a convoy consisting of aircraft where the speed is piloted manually, the automation of the speed of at least some aircraft provides a way of reducing the distances between the aircraft, and increasing the overall speed of the convoy. This reduction of the margins, which would be hazardous or even impossible in manual piloting, makes it possible to create denser convoys of aircraft, in which the aircraft are more grouped together. It is therefore possible to form longer convoys than in manual piloting mode (that is, convoys consisting of more aircraft), or, given an equal number of aircraft, form shorter convoys.

Furthermore, when the lock is applied automatically by the device 10, the pilot is relieved of the entire workload corresponding to the manual piloting of the aircraft, which allows him to concentrate on other tasks, in particular monitoring the outside environment (movements of the other vehicles, surrounding objects), or communications with air traffic/ground control. Furthermore, this automatic locking can be implemented with degraded visual conditions (for example at night) or atmospheric conditions (rain, fog, snow) which would make manually piloting the following of the convoy difficult or impossible.

The consequence of the abovementioned advantages is that the use of convoys of aircraft makes it possible increase the density of the traffic on the ground, and reduce overall the occupancy time of the runways and of the taxiways by the convoys. In the current context of saturation of the major international airports, the increase in traffic, while maintaining an equivalent safety level, presents an obvious economic benefit for the airlines and the airports.

The invention claimed is:

1. A method for managing a convoy of at least two aircraft which follow one another along a common taxi trajectory for taxiing on the ground, in which one aircraft is a leader aircraft, and at least one aircraft is a following aircraft that follows the leader aircraft, said method comprising the steps of:

exchanging, by a first data transmission unit, information between the aircraft of the convoy concerning flight parameters of the aircraft within the convoy;

exchanging, between the aircraft of the convoy and at least one control station that manages the convoy collectively, information relating to the collective convoy, wherein:

the exchange is carried out by a second data transmission unit, and said at least one control station receives from each aircraft in the convoy information relating to convoy status, centralizes the received information, schedules the convoy, and transmits to each aircraft a convoy status table that indicates overall status of the convoy, and which is updated according to status information transmitted individually by each aircraft; and wherein the following steps are carried out by a control system mounted on the following aircraft:

generating a yaw speed instruction enabling the following aircraft to laterally follow a taxi trajectory for taxiing on the ground, which is common to the aircraft of said convoy;

receiving the convoy status table, which describes current status of the convoy and indicates a longitudinal separation between said following aircraft and at least one preceding aircraft in the convoy;

generating, according to said current status table, a longitudinal speed instruction enabling the following aircraft to observe said longitudinal separation; and controlling the following aircraft, according to said yaw speed instruction and said longitudinal speed instruction, to taxi on the ground within the convoy of aircraft.

2. The method as claimed in claim 1, wherein the longitudinal speed instruction is limited by an allowable maximum speed envelope.

3. The method as claimed in claim 1, wherein said longitudinal speed instruction is calculated by taking into account one of the following information items:

a separation between the following aircraft and a preceding aircraft in the convoy;

a separation between the following aircraft and the leader aircraft of the convoy; and separations between the following aircraft, the preceding aircraft and the leader aircraft.

4. The method as claimed in claim 1, wherein said status table includes, for each aircraft of the convoy, at least the following information:

aircraft rank in the convoy;

names of the aircraft in the convoy; and separation between aircraft.

5. The method as claimed in claim 4, wherein the separation is based on type and dimensions of the following aircraft and the leader aircraft, on runway status and on visibility.

6. The method as claimed in claim 1, wherein the longitudinal speed instruction is monitored so as to:

limit the longitudinal speed instruction within a limit of normal operational capabilities of the aircraft; and grant a speed or acceleration authority greater than the limit of the normal operational capabilities of aircraft to maintain security conditions.

7. The method as claimed in claim 1, wherein the leader aircraft of the convoy is piloted according to a speed profile that takes account constraints associated with at least one following aircraft of the convoy.

8. The method as claimed in claim 1, further comprising the steps of:

attaching an aircraft to said convoy, by determining an attachment point which is situated on the ground and which represents a beginning portion of a common trajectory between the attached aircraft and the convoy, with said attached aircraft being attached upon passing said attachment point; and detaching an aircraft from the convoy, by determining a detachment point which is situated on the ground and which represents a point marking an end portion of common trajectory between the detached aircraft and the convoy, with said aircraft being detached upon passing the detachment point at a predetermined safety distance.

9. An aircraft taxi management system for managing a convoy of at least two aircraft that follow one another along a common trajectory, wherein one aircraft is a lead aircraft and at least one aircraft is a following aircraft, said system comprising:

at least one control station;

first data transmission unit that exchanges information between the aircraft of the convoy relating to flight parameters of the aircraft within the convoy;

second data transmission unit that exchanges, between the aircraft of the convoy and the at least one control station that manages the convoy collectively, information relating to the collective convoy, wherein the at least one control station receives from each aircraft information relating to convoy status, centralizes the received information, schedules the convoy, and transmits to each aircraft a convoy status table that indicates overall status of the convoy, and which is updated according to status information transmitted individually by each aircraft; and a control system mounted on the following aircraft which comprises:

yaw speed generator that generates a yaw speed instruction for the at least one following aircraft to laterally follow a trajectory for taxiing on the ground, which is common to the aircraft of said convoy;

convoy status unit that receives a current convoy status table, which describes current status of the convoy and indicates a longitudinal separation between said following aircraft and at least one preceding aircraft in the convoy;

longitudinal speed instruction generator that generates, according to said status table, a longitudinal speed instruction enabling the following aircraft to observe said longitudinal separation; and control assist unit that assists in controlling the following aircraft taxiing on the ground within the convoy, according to said yaw speed instruction and said longitudinal speed instruction.

10. The management system as claimed in claim 9, wherein said control assist unit further comprises:

a guidance unit that automatically guides said following aircraft; and a display unit.

* * * * *